(No Model.)
E. THOMSON.
REGULATOR FOR DYNAMO ELECTRIC MACHINES.
No. 324,501. Patented Aug. 18, 1885.
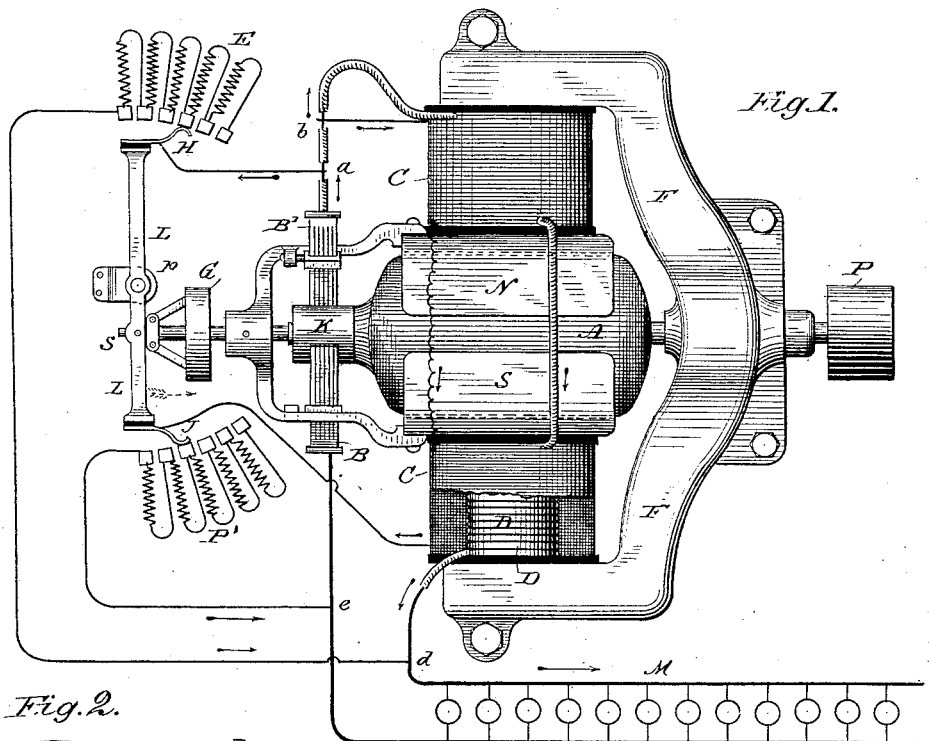
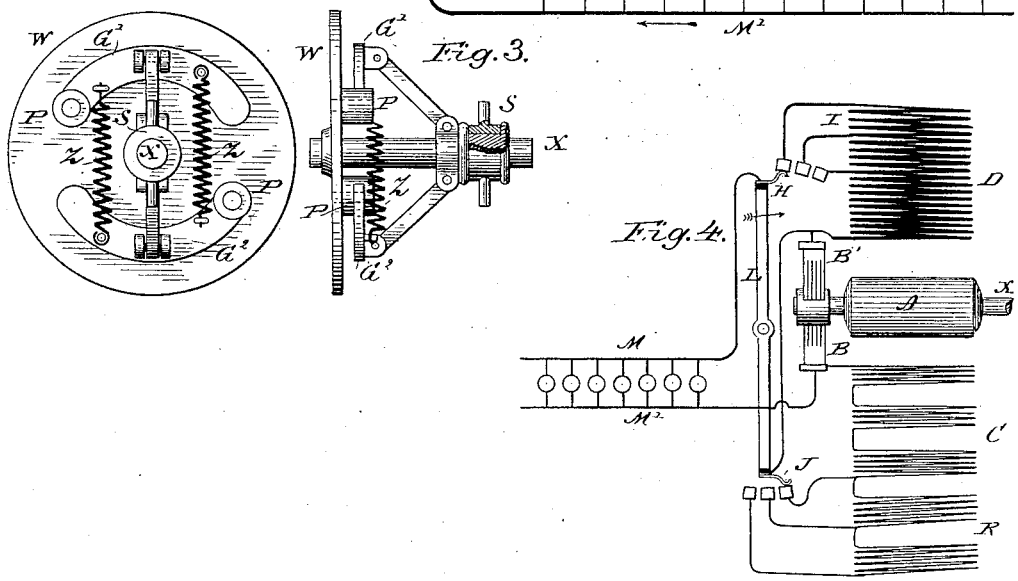
Witnesses:
Ernst Abshagen
Thos. Toomey
Inventor:
Elihu Thomson
By his Attorney: H. C. Townsend

UNITED STATES PATENT OFFICE.

ELIHU THOMSON, OF LYNN, MASSACHUSETTS.

REGULATOR FOR DYNAMO-ELECTRIC MACHINES.

SPECIFICATION forming part of Letters Patent No. 324,501, dated August 18, 1885.

Application filed October 20, 1884. (No model.)

*To all whom it may concern:*

Be it known that I, ELIHU THOMSON, a citizen of the United States, and a resident of Lynn, in the county of Essex and State of Massachusetts, have invented certain new and useful Improvements in Dynamo-Electric Machines, of which the following is a specification.

My invention relates to dynamo machines of the class denominated "compound wound"—that is, those in which the field is maintained by two sets of coils upon the field-magnet, one set in series with the armature and main circuit, and the other of high resistance in a branch or derived circuit.

The object of my invention is to provide a means whereby disturbances due to changes of the speed in such machine may be avoided; and it consists in providing an automatic compensation by changing the strength of the field-magnet automatically by any suitable means responsive to or controlled by speed mechanism, itself controlled by changes in the speed of the machine.

My invention is especially applicable to compound-wound machines when used for incandescent lamps or other apparatus in multiple arc, requiring a definite or constant electro-motive force. I have found that machines of this class require that the speed in accordance with which their coils are properly proportioned must be very exactly maintained. Variations of any considerable amount from the normal or determined speed are not permissible. My present invention obviates this difficulty and permits moderate variations of speed.

In carrying out my invention, I propose to employ any of the well-known means whereby the magnetizing action of a set of coils may be varied, and for this purpose may cut out coils, shunt current from them, or otherwise change their effects. This regulation I apply to both the main-circuit coils and the shunt-wound coils of compound-wound dynamo.

To control the operation of the devices that operate upon the main and derived circuit coils, I use any desired form of speed indicator or governor, such as is used for steam-engines, speed indicators or measurers, or other apparatus, the variations or amounts of whose speed it is desired to indicate, record, or govern. Such speed indicator or governor I connect or gear to the dynamo shaft, the driving-engine, or other portion of the apparatus, such that a variation of the speed of the dynamo shall be felt and manifested in the speed indicator or governor. The preferred form of the latter is the well-known ball-governor, which, for the sake of simplicity, I mount directly upon the armature-shaft of the dynamo-machine.

Having described the general nature of my invention, I will proceed to describe more particularly some of the ways in which it may be carried out.

In the accompanying drawings, Figure 1 is a plan of a machine and the connections therefor having my invention applied to it. Figs. 2 and 3 are respectively face and edge views of a form of speed governor or indicator that may be employed. Fig. 4 is a diagram of a modified arrangement of circuits for varying the strength of the field.

A indicates the armature of a Gramme, Siemens, or other style of dynamo electric machine, and P a driving-pulley on the armature-shaft.

N S indicate the pole-pieces of the field-of-force magnet, between which pole-pieces the armature is rotated, as usual, and D the field-magnet coils, of coarse wire, in the main circuit with the armature. The shunt or derived circuit coils of high resistance are indicated at C.

B B' indicate the commutator-brushes, applied adjustably or otherwise at proper points on the commutator-cylinder K.

At E is indicated a variable resistance, of any desired kind, that shown consisting of a set of resistance-coils connected to a set of contacts over which a contact-brush, H, rides. The latter is carried by a lever, L, and the whole forms a variable resistance in a shunt around the main-circuit coils D, being connected to the terminals of said coils at the points $a\ d$, as indicated. When the brush H is moved, current is shunted from the coils D to a greater or less extent, dependent upon the number of resistance-coils that are in circuit.

At P' are indicated the coils of a similar variable resistance, controlled by a brush, J, also carried by the lever L. The latter resistance is in the branch or shunt circuit with the high-resistance coils C C, as indicated, said branch or shunt circuit of high resistance being taken from the main or principal circuit at the points e b. The effect of moving the brush J to increase the amount of resistance at P is obviously to increase the total resistance in the branch or shunt, and to therefore diminish the flow of current in said branch and coils C. The movement of the lever L which will produce this result will obviously at the same time cause such a movement of the brush H as to cut down the resistance at E, and to therefore diminish the flow of current in the main-circuit coils D by shunting current from them.

M M' indicate the leading and return conductors of a main feeding-current to a number of incandescent lamps in multiple arc.

The lever L is operated or controlled by any suitable mechanism responsive to changes in the speed of rotation of the armature, and is moved in such direction on an increase of speed as to increase the resistance in the high-resistance shunt field-coil, and to diminish the resistance in the short-circuit shunt or branch around the main-circuit field-coil D, with the evident result of weakening the field-magnetism to an extent dependent upon the amount of increase in the speed.

A suitable governor or indicator mechanism that may be used to operate the lever responsively to variations of speed is shown in Figs. 2 and 3. It consists of a disk, plate, or other suitable support mounted on the armature-shaft X, and a pair of arms or wings, G' G², which are analogous to the arms of a ball-governor, and are pivoted at P P on the disk, so that their ends may swing outward under the influence of centrifugal force.

Z Z are retracting-springs for the arms. The arms are connected by links with a sleeve, S, longitudinally movable on the shaft or other support, and carrying a loose collar, to which the lever L is connected. An increase in the rapidity of revolution of the disk W moves the sleeve and collar toward the disk and causes the lever L or other support for the resistance-varying devices to move in the manner already described, so as to decrease the strength of the magnetic field in which the armature revolves.

The same effect that is accomplished by the employment of the variable resistances may be attained by dividing the field-magnet coils D and C into sections, as indicated in Fig. 4, and by causing the contact or switch springs H and J to throw coils into or out of circuit, as may be desired. Thus, if the lever L or other support controlled by the speed governor or indicator be moved in the direction of the arrow, the number of convolutions of D in circuit will be diminished and the convolutions of C in circuit will be increased, thus increasing the resistance of C and lowering the current in its coils. The effect, as with the arrangement of Fig. 1, is to lower the field magnetism, and therefore the electromotive force, of the current developed in the armature. The parts are so adjusted that with moderate changes of speed a given difference of electro-motive force or potential is maintained between the brushes B B'.

The proportions of movement, resistance, &c., to be used vary with every detail of dynamo construction and operation, and cannot be, therefore, specified. The generator may also be used as a motor, but will regulate to approximate speeds only when put upon a line of constant current strength.

Although I have shown the field-varying device as connected directly with the speed governor or indicator, I do not limit myself to such special arrangement, but may cause the movement of the speed-indicator to vary the position of the lever L, or other device used in its place, in any other mechanical way or through the intervention of other agents or powers controlled in their action by the speed-governor.

What I claim as my invention is—

1. The combination, with a compound-wound dynamo-electric machine, of means for simultaneously varying the flow of exciting-current on the main and derived circuit, as described, and controlling devices responsive to changes in the speed of the armature, whereby the flow of exciting-current may be varied correspondingly with variations in the speed.

2. The combination, in a dynamo-electric machine having a main and a derived exciting-circuit, of means for simultaneously decreasing the exciting-current in the main circuit and increasing the resistance in the derived circuit, or vice versa, and controlling devices responsive to changes in the speed of the machine, as and for the purpose described.

3. The combination, in a shunt-wound dynamo-electric machine, of a variable resistance in a shunt around the main-circuit coils, a variable resistance in circuit with the derived-circuit coils, and a speed indicator or governor controlling the devices, whereby the resistances are adjusted in the manner described, so as on an increase of speed in the machine to shunt current from the main-circuit coils while simultaneously increasing the resistance in the derived circuit.

Signed at Lynn, in the county of Essex and State of Massachusetts, this 16th day of October, A. D. 1884.

ELIHU THOMSON.

Witnesses:
M. L. THOMSON,
A. P. SEYMOUR.